United States Patent
Duanmu et al.

(10) Patent No.: US 11,570,417 B2
(45) Date of Patent: Jan. 31, 2023

(54) IMMERSIVE VIDEO STREAMING USING VIEW-ADAPTIVE PREFETCHING AND BUFFER CONTROL

(71) Applicant: Apple Inc., Cupertino, CA (US)

(72) Inventors: Fanyi Duanmu, San Jose, CA (US); Jun Xin, San Jose, CA (US); Hsi-Jung Wu, San Jose, CA (US); Xiaosong Zhou, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/326,204

(22) Filed: May 20, 2021

(65) Prior Publication Data

US 2022/0377304 A1 Nov. 24, 2022

(51) Int. Cl.
| | |
|---|---|
| *H04N 13/00* | (2018.01) |
| *H04N 21/24* | (2011.01) |
| *H04N 21/218* | (2011.01) |
| *H04N 13/117* | (2018.01) |
| *H04N 13/178* | (2018.01) |

(52) U.S. Cl.
CPC ......... *H04N 13/117* (2018.05); *H04N 13/178* (2018.05); *H04N 21/21805* (2013.01); *H04N 21/2401* (2013.01); *H04N 21/2402* (2013.01)

(58) Field of Classification Search
CPC ............... H04N 13/117; H04N 13/178; H04N 21/21805; H04N 21/2401; H04N 21/2402
See application file for complete search history.

(56) References Cited

U.S. PATENT DOCUMENTS

| | | | | |
|---|---|---|---|---|
| 10,848,738 | B1 * | 11/2020 | Petrangeli | ............ H04N 13/376 |
| 11,218,530 | B2 * | 1/2022 | Skupin | ............... H04N 21/8456 |
| 2018/0176468 | A1 * | 6/2018 | Wang | ................... H04N 19/597 |
| 2020/0107003 | A1 * | 4/2020 | Phillips | ............ H04N 21/21805 |
| 2020/0228780 | A1 * | 7/2020 | Kim | .................... H04N 21/2387 |
| 2021/0329214 | A1 * | 10/2021 | Oh | ......................... H04N 13/178 |
| 2021/0360219 | A1 * | 11/2021 | Wang | ................... H04N 13/178 |

* cited by examiner

*Primary Examiner* — Alazar Tilahun
(74) *Attorney, Agent, or Firm* — Fish & Richardson P.C.

(57) ABSTRACT

A system obtains a data set representing immersive video content for display at a display time, including first data representing the content according to a first level of detail, and second data representing the content according to a second higher level of detail. During one or more first times prior to the display time, the system causes at least a portion of the first data to be stored in a buffer. During one or more second times prior to the display time, the system generates a prediction of a viewport for displaying the content to a user at the display time, identifies a portion of the second data corresponding to the prediction of the viewport, and causes the identified portion of the second data to be stored in the video buffer. At the display time, the system causes the content to be displayed to the user using the video buffer.

22 Claims, 10 Drawing Sheets

POINT CLOUDS WITH INCREASING LEVELS OF DETAIL

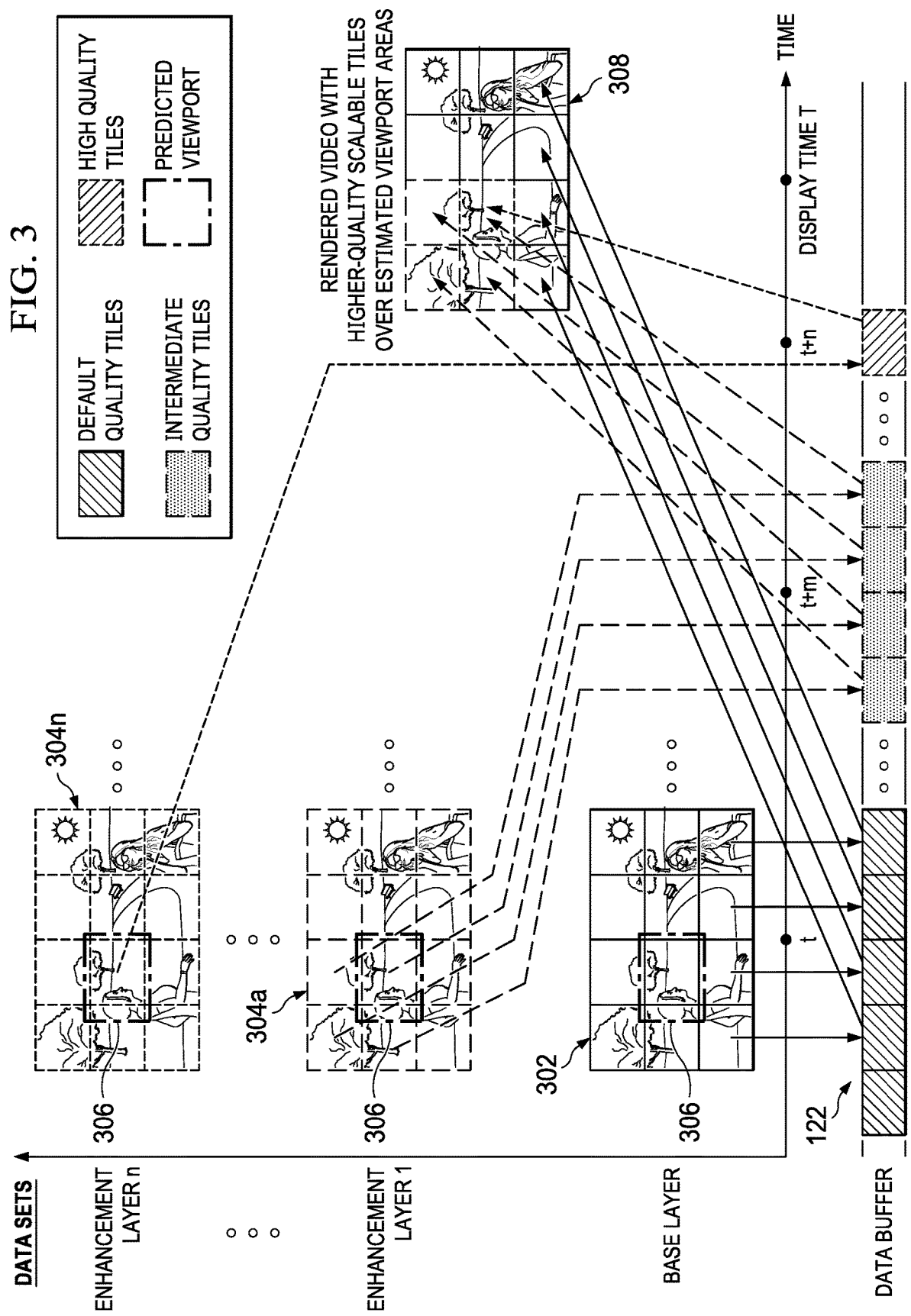

IMMERSIVE VIDEO STREAMING USING VIEW-ADAPTIVE PREFETCHING AND BUFFER CONTROL

TECHNICAL FIELD

This disclosure relates generally to streaming immersive video content for presentation to a user.

BACKGROUND

Computer systems can be used to generate and present immersive video content (sometimes referred to as omnidirectional video content). As an example, a computer system can generate video content according to a range of viewing directions with respect to a reference point. Further, the computer system can present at least a portion of the video content to a user according to a particular viewpoint.

SUMMARY

In an aspect, a method includes obtaining, by one or more processors, a data set representing immersive video content for display at a display time, where the data set includes first data representing the immersive video content according to a first level of detail, and second data representing the immersive video content according to a second level of detail, where the second level of detail is higher than the first level of detail; during one or more first times prior to the display time, causing, by the one or more processors, at least a portion of the first data to be stored in a video buffer; during one or more second times subsequent to the one or more first times and prior to the display time: (i) generating, by the one or more processors, a prediction of a viewport for displaying the immersive video content to a user at the display time, (ii) identifying, by the one or more processors, a portion of the second data corresponding to the prediction of the viewport, and (iii) causing, by the one or more processors, the identified portion of the second data to be stored in the video buffer; and at the display time, causing, by the one or processors, the immersive video content to be displayed to the user using the video buffer.

Implementations of this aspect can include one or more of the following features.

In some implementations, the data set can further include third data representing the immersive video content according to a third level of detail, where the third level of detail is higher than the second level of detail. The method can further include, during one or more third times subsequent to the one or more second times and prior to the display time, (i) identifying, by the one or more processors, a portion of the third data corresponding to the prediction of the viewport, and (ii) causing, by the one or more processors, the identified portion of the third data to be stored in the video buffer.

In some implementations, the portion of the third data can correspond to a first spatial area. The portion of the second data can correspond to a second spatial area greater than the first spatial area.

In some implementations, the first level of detail can correspond to a first resolution. The second level of detail can correspond to a second resolution greater than the first resolution.

In some implementations, the first level of detail can correspond to a first bit rate. The second level of detail can correspond to a second bit rate greater than the first bit rate.

In some implementations, the first data can include a base layer representing the immersive video content. The second data can include an enhancement layer representing the immersive video content.

In some implementations, the immersive video content can be displayed to the user using a wearable display device.

In some implementations, causing the immersive video content to be displayed to the user can include generating a composite of data stored in the video buffer, and causing at least a portion of the composite to be displayed to the user.

In some implementations, the prediction of the viewport can be generated based on second data representing one or more second viewports that were used to display the immersive video content to one or more second users.

In some implementations, the data set can include metadata specifying the viewport for displaying the immersive video content to the user at the display time. The prediction of the viewport can be generated based on the metadata.

In another aspect, a method includes obtaining, by one or more processors, a data set representing immersive video content; causing, by the one or more processors, a portion of the data set to be stored in a video buffer, where the properties of the portion of the data set vary depending on at least one of: (i) first data indicating a behavior of a first user while viewing the immersive video content, (ii) second data indicating a behavior of a plurality of additional users while viewing the immersive video content, or (iii) metadata included in the data set; and causing, by the one or processors, the immersive video content to be displayed to a user using the video buffer.

Implementations of this aspect can include one or more of the following features.

In some implementations, the first data can indicate a viewport selected by the first user while viewing the immersive video content.

In some implementations, the first data can indicate a trajectory of viewports selected by the first user while viewing the immersive video content.

In some implementations, the second data can indicate a plurality of additional viewport selected by the additional users while viewing the immersive video content.

In some implementations, the method can further include determining a variation in the additional viewports. The properties of the portion of the data set can vary depending on the variation in the additional viewports.

In some implementations, the metadata can include suggested properties of the portion of the data set.

In some implementations, the properties of the portion of the data set can include at least one of a bit rate of the portion of the data set, a bit length of the portion of the data set, or a coding structure of the portion of the data set.

In some implementations, the immersive video content can be displayed to the user using a wearable display device.

In another aspect, a method includes obtaining, by one or more processors, a data set representing immersive video content for display by a display device, where the data set includes (i) first data representing the immersive video content according to a first level of detail, and (ii) second data representing the immersive video content according to a second level of detail, where the second level of detail is higher than the first level of detail; causing, by the one or more processors (i) at least a portion of the first data to be transmitted to the display device using a first communications link, and (ii) at least a portion of the second data to be transmitted to the display device using a second communications link, substantially concurrently with the transmission of at least the portion of the first data using the first communications link, where the first communication link is different from the second communications link; and causing, by the one or more processors, the immersive video content to be displayed to a user based the transmitted portion of the first data and the transmitted portion of the second data.

Implementations of this aspect can include one or more of the following features.

In some implementations, the first link can have a first bandwidth, and the second link can have a second bandwidth greater than the first bandwidth.

In some implementations, the first link can have a first latency, and the second link can have a second latency less than the first latency.

In some implementations, the first link can be associated with a first cost, and the second link can be associated with a second cost greater than the first cost.

In some implementations, the first link can be at least one of a Wi-Fi link or a transmission control protocol (TCP) link.

In some implementations, the second link can be at least one of a Fifth Generation (5G) cellular link or a user datagram protocol (UDP) link.

In some implementations, the first level of detail can correspond to a first resolution, and the second level of detail can correspond to a second resolution greater than the first resolution.

In some implementations, the first level of detail can correspond to a first bit rate, and the second level of detail can correspond to a second bit rate greater than the first bit rate.

In some implementations, the first data can include a base layer representing the immersive video content, and the second data can include an enhancement layer representing the immersive video content.

In some implementations, the immersive video content can be displayed to the user using a wearable display device.

Other implementations are directed to systems, devices, and non-transitory, computer-readable media having instructions stored thereon, that when executed by one or more processors, cause the one or more processors to perform operations described herein.

The details of one or more embodiments are set forth in the accompanying drawings and the description below. Other features and advantages will be apparent from the description and drawings, and from the claims.

BRIEF DESCRIPTION OF DRAWINGS

FIG. 3 is a diagram of an example view-adaptive prefetching technique for streaming and buffering video content.

DETAILED DESCRIPTION

Figure 1:
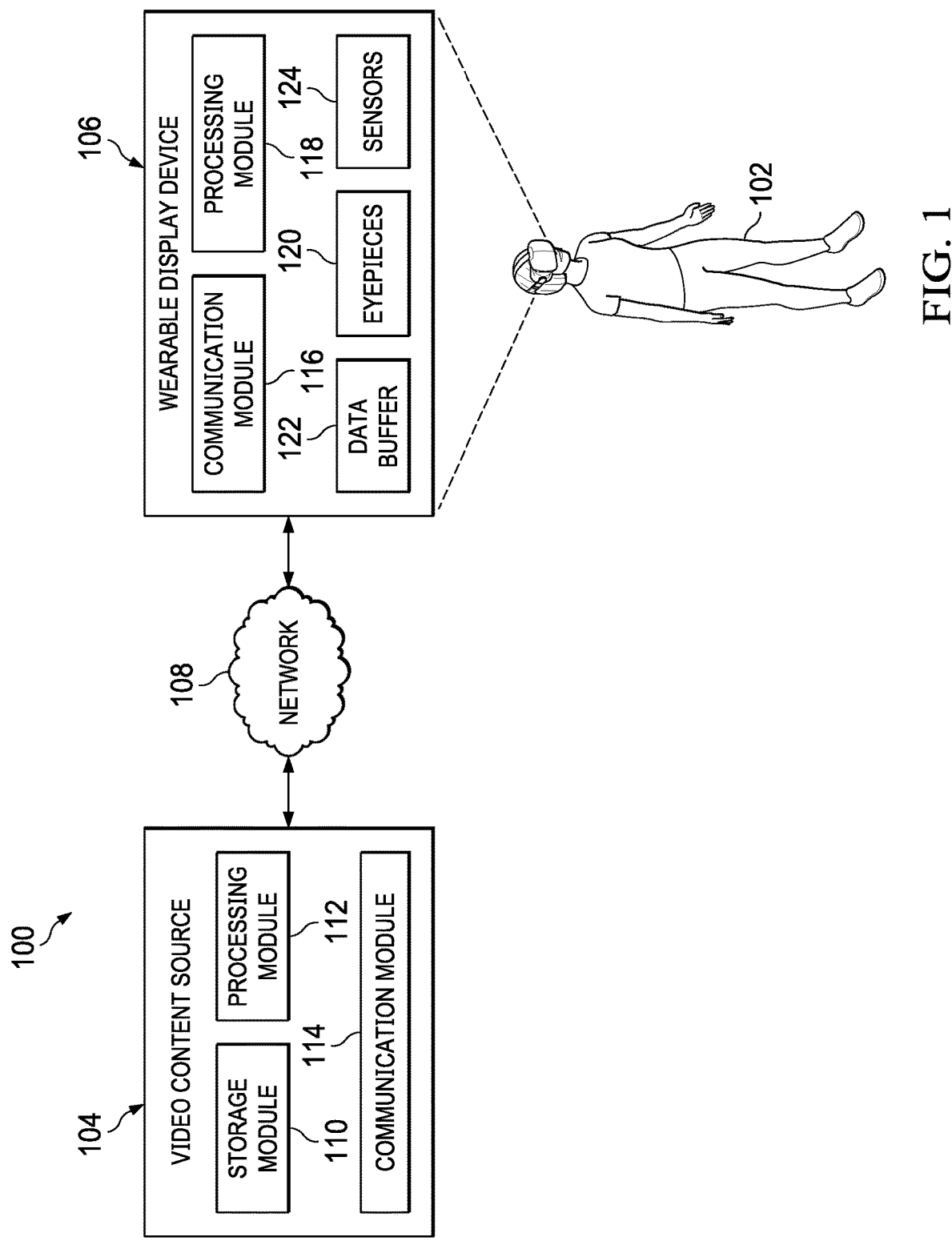
FIG. 1 is a diagram of an example system for streaming immersive video content for presentation to a user.

This disclosure describes techniques for streaming immersive video content for presentation to a user.

In general, computer systems can generate immersive video content (sometimes referred to as omnidirectional video content). As an example, immersive video content can include visual data that can be presented according to a range of viewing directions and/or viewing locations. Portions of the immersive video content can be selectively presented to a user to give the user the impression that she is viewing the visual data according to a particular field of view and/or viewing perspective.

In some implementations, immersive video content can be presented to a user in three-dimensions using a wearable display device, such as a virtual reality headset or an augmented reality headset. Further, different portions of the immersive video content can be presented to a user, depending on the position and orientation of the user's body and/or the user's inputs.

In some implementations, only a subset of the immersive video content is presented to a user at any given point of time (e.g., corresponding to a selected perspective, point of view, or field of view of the user). Accordingly, rather than transmitting the entirety of the video content, selected portions of the video content can be transmitted from a content source to a display device. The portions of the video content that are transmitted can be selected depending on the characteristics of the video content, the behavior of the user, and/or the behavior of other uses who previously viewed the video content. This can be beneficial, for example, in reducing the computational resources and/or network resources that are expended to present the video content.

In some implementations, immersive video content can be transmitted from a content source (e.g., a video content server) to a display device (e.g., a wearable display device) according to a view-adaptive prefetching technique. As an example, multiple sets of video content can be generated to accommodate end clients having different capabilities or requirements. For instance, a first set of data can represent the video content according to a low level of detail, such that the data can be transmitted and/or presented using a smaller amount of computational and network resources. Further, additional sets of data can represent the same video content according to progressively higher level of detail, such that the video content can be presented with a higher quality level (e.g., with the trade-off that a larger amount of computation and network resources may be expended).

Prior to the presentation of the video content at a particular display time, the first data set can be streamed from the content source to a data buffer on the display device, such that the wearable display device has sufficient information to present the video content at the display time according to a wide range of viewing perspectives or points of view. Subsequently, the user's viewing perspective at the display time can be predicted, and the portion of the additional data corresponding to the predicted viewing perspective can be selectively streamed from the content source to the data buffer on the display device. This can be beneficial, for example, in enabling the display device to present video content corresponding to the predicted viewing perspective according to a higher level of detail in some situations (e.g., if the viewing perspective of the user at the display time coincides with the predicted viewing perspective), while also enabling the display device to present video content corresponding to any other viewing perspective according to a lower level of detail in other situations (e.g., if the viewing perspective of the user at the display device does not coincide with the predicted viewing perspective, and/or the performance of the network is degraded). Accordingly, the presentation of video content remains uninterrupted, even if the user's behavior and/or inputs are different than expected. Further, the presentation of video content is more resilient against changes to the network environment.

Further, in some implementations, video content can be streamed and stored in the data buffer differently, depending on the behavior of the user viewing the video content, the behavior of other users that previously viewed the video content, and/or the characteristics of the video content. For example, if this information indicates that the user's viewing perspective can be predicted with a higher degree of certainty, a greater amount of data can be streamed to the data buffer (e.g., such that the video content can be presented according to a higher quality level). As another example, if this information indicates that the use's viewing perspective can be predicted only with a lower degree of certainty, a smaller amount of data can be streamed to the data buffer (e.g., such that fewer computational and/or network resources are expended).

Further, in some implementations, different sets of data can be streamed from a content source to a display device using different types of communications links. For example, data representing video content according to a lower level of detail can be transmitted using a communications link having lower capabilities and/or lower associated costs, whereas data representing video content according to a higher level of detail can be transmitted using a communications link having higher capabilities and/or higher associated costs. This can be beneficial, for example, in enabling data to be adaptively streamed from a content source to a display device, such that resources are expended in a more efficient and a more effective manner.

FIG. 1 shows an example system 100 for presenting immersive video content to a user 102. The system 100 includes a video content source 104 communicatively coupled to a wearable display device 106 via a network 108.

During an example operation of the system 100, the video content source 104 streams immersive video content to the wearable display device 106 via the network 108. At least some of the streamed video content is stored in a data buffer of the wearable display device 106 (e.g., in preparation for presentation), and is presented by the wearable display device 106 to the user 102 according to a particular display time.

The video content source 104 can include any number of electronic devices that are configured to receive, process, and transmit video content. Examples of the video content source 104 include client computing devices (e.g., desktop computers or notebook computers), server computing devices (e.g., server computers or cloud computing systems), mobile computing devices (e.g., cellular phones, smartphones, tablets, personal data assistants, notebook computers with networking capability), and other computing devices capable of receiving, processing, and transmitting video content. In some implementations, the video content source 104 can include computing devices that operate using one or more operating systems (e.g., Microsoft Windows, Apple macOS, Linux, Unix, Google Android, and Apple iOS, among others) and one or more architectures (e.g., x86, PowerPC, and ARM, among others). In some implementations, video content source 104 need not be located locally with respect to the rest of the system 100, and video content source 104 can be located in one or more remote physical locations.

In FIG. 1, the video content source 104 is illustrated as respective single component. However, in practice, the video content source 104 can be implemented on one or more computing devices (e.g., each computing device including at least one processor such as a microprocessor or a microcontroller).

The video content source 104 includes a storage module 110 configured to store immersive video content. The storage module 110 can include one or more devices for storing data electronically, such as semiconductor memory devices (e.g., EPROM, EEPROM, and NAND flash memory devices), magnetic disks (e.g., internal hard disks, and removable disks), magneto optical disks, and CD-ROM and DVD-ROM disks.

The video content source 104 also includes a processing module 112 configured to process immersive video content and selectively transmit portions of the video content to the wearable display device 106 (e.g., using a communications module 114). As an example, the processing module 112 can include one or more computer processors, including general microprocessors and/or special use circuitry (e.g., field programmable gate arrays, FPGAs, or application specific integrated circuits, ASICs).

The communications module 114 enables data to be transmitted to and from the video content source 104. For example, the communications module 14 can be communicatively connected to the network 108, such that it can transmit data to and/or receive data from the wearable display device 106. In some implementations, the communications module 114 can include one or more wireless and/or wired transceivers. Example transceivers include Ethernet transceivers, serial communication transceivers (e.g., RS-232 transceiver), and/or wireless transceivers (e.g., Wi-Fi transceivers, Bluetooth transceivers, cellular transceivers, infrared transceivers, etc.).

The network 108 can be any communications network through which data can be transferred and shared. For example, the network 108 can be a local area network (LAN) or a wide-area network (WAN), such as the Internet. The network 108 can be implemented using various networking interfaces, for instance wireless networking interfaces (e.g., Wi-Fi, Bluetooth, or infrared) or wired networking interfaces (e.g., Ethernet or serial connections). The network 108 also can include combinations of more than one network, and can be implemented using one or more networking interfaces.

The wearable display device 106 can be any device that is configured to be worn by a user and to display visual data to user. As an example, the wearable display device 106 can be a wearable headset, such as a virtual reality headset, an augmented reality headset, a mixed reality headset, or a wearable holographic display.

The wearable display device 106 includes a communications module 116 that is communicatively coupled to the network 108 and configured to receive data from and/or transmit data to the video content source 104. In some implementations, the communications module 116 can include one or more wireless and/or wired transceivers. In some implementations, the communications module 116 can be similar to the communications module 114 of the video content source 104. For example, the communications module 116 can include one or more transceivers such as Ethernet transceivers, serial communication transceivers (e.g., RS-232 transceiver), and/or wireless transceivers (e.g., Wi-Fi transceivers, Bluetooth transceivers, cellular transceivers, infrared transceivers, etc.).

The wearable display device 106 also includes a processing module 118 configured to process immersive video content and selectively display portions of the immersive video content to a user (e.g., using eyepieces 120). As an example, the processing module 118 can include one or more computer processors, including general microprocessors and/or special use circuitry (e.g., field programmable gate arrays, FPGAs, or application specific integrated circuits, ASICs).

Each of the eyepieces 120 is configured to present video content visually to a user. As an example, the eyepieces 120 can be configured, such that when the wearable display device 106 is worn by the user 102, each of the eyepieces 120 is positioned in front of a respective one of the user's eyes. Further, the eyepieces 120 can present video content differently to each of the user's eyes, such that the video content appears in three-dimensions to the user 102. In some implementations, each of the eyepieces 120 can include one or more light sources (e.g., for generating light representing the video content) and optical lenses (e.g., to direct and focus the light onto the user's eyes). In some implementations, each of the eyepieces 120 can include one or more display panels, such as liquid crystal displays (LCDs), light emitting diode (LED) panels, and/or organic light emitting diode (OLED) panels for displaying visual data to the user 102.

In some implementations, at least some of the immersive video content received by the wearable display device 106 is stored (e.g., temporarily) in a data buffer 122, prior to the presentation of the video content to the user 102. For example, the processing module 118 can receive portions of video content from video content source 104 (e.g., via the communications module 116), determine that those portions of the video content are intended to be presented to a user at a particular display time, and instruct the portions of the video content to be stored in the data buffer 122. At or prior to the display device, the processing module 118 can retrieve the portions of video content from the data buffer 122, and instruct the video content to be presented to the user at the display time (e.g., using the eyepieces 120). In some implementations, the data buffer 122 can be implemented in software (e.g., software registers), hardware (e.g., hardware registers, physical memory, physical storage, etc.), or both.

As described above, immersive video content can include visual data that can be presented according to a range of viewing directions and/or viewing locations.

In some implementations, immersive video content can include visual data that can be presented according to a 360° range about a point of reference (e.g., in any angle along a plane with respect to the point of reference). In some implementations, immersive video content can include visual data that can be presented according to less than a 360° range about a point of reference (e.g., in a subset of angles along a plane with respect to the point of reference).

In some implementations, immersive video content can include visual data that can be presented according to any direction about a point of reference (e.g., in any inclination angle and any azimuthal angle with respect to the point of reference). In some implementations, immersive video content can include visual data that can be presented according to a subset of directions about a point of reference (e.g., in a subset of inclination angles and/or azimuthal angles with respect to the point of reference).

Portions of the immersive video content can be selectively presented to a user to give the user the impression that she is viewing the video content according to a particular field of view and/or viewing perspective. Further, different portions of the video content can be presented to a user, depending on the position and orientation of the user's body and/or the user's inputs.

For instance, the wearable display device 106 can include one or more sensors 124 configured to determine the positon and/or orientation of the head of the user 102 as she views the immersive video content. Example sensors 124 include accelerometers, gyroscopes, orientation systems, photodetectors, cameras, and/or ranging sensors (e.g., time of flight sensors, LIDAR sensors, etc.). Based on measurements obtained by the sensors 124, the wearable display device 106 can determine a position and/or orientation of the head of the user 102 and a corresponding viewport for presenting the immersive video content to the user. The viewport can represent, for the example, the field of view and/or viewing perspective of the user within a visual environment.

Figure 2A:
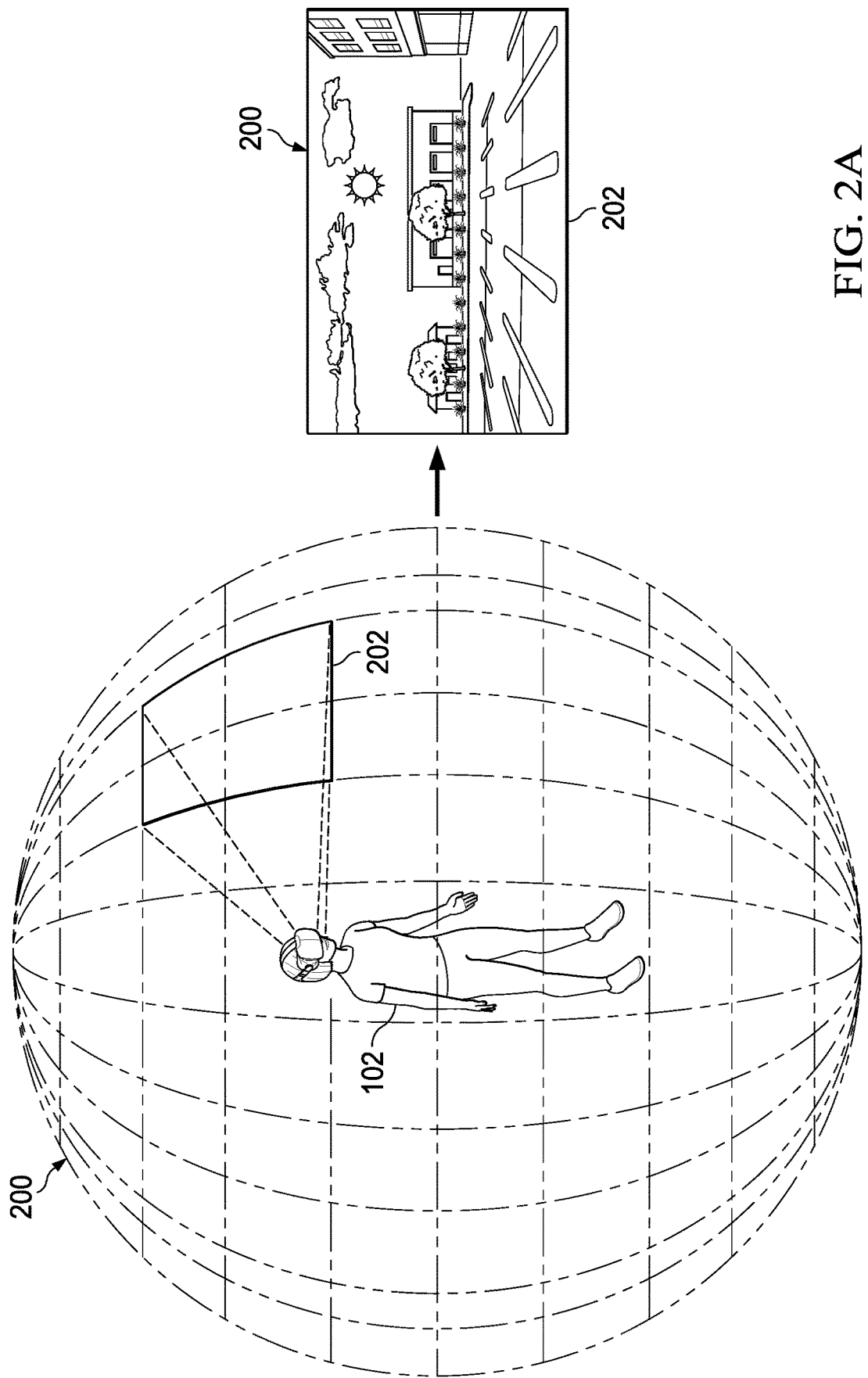
FIG. 2A is a diagram of an example viewport for presenting immersive video content.

As an example, referring to FIG. 2A, immersive video content 200 can include visual data that can be presented according to a range of viewing directions and/or viewing locations with respect to a user 102 (represented in FIG. 2A as a sphere surrounding the user 102). A viewport 202 can be selected to present a portion of the immersive video content 200 to the user 102 (e.g., based the position and/or orientation of the user's head) to give the user 102 the impression that she is viewing the visual data according to a particular field of view and/or viewing perspective. Further, the viewport 202 can be continuously updated based on the user's movements to give the user the impression that she is shifting her gaze within a visual environment.

For example, if the wearable display device 106 determines that the user's head is oriented in a forward direction, the wearable display device 106 can generate a viewport 202 that corresponds to a forward viewing perspective, and present the portion of immersive video content 200 within that viewport 202 to the user using the eyepieces 120 (e.g., to give the user the impression that she is looking forward within a visual environment). As another example, if the wearable display device 106 determines that the user has turned her head to the right, the wearable display device 106 can generate a viewport 202 that corresponds to a rightward viewing perspective, and present the portion of the immersive video content 200 within that viewport 202 to the user using the eyepieces 120 (e.g., to give the user the impression that she is looking towards the right within the visual environment).

Figure 2B:
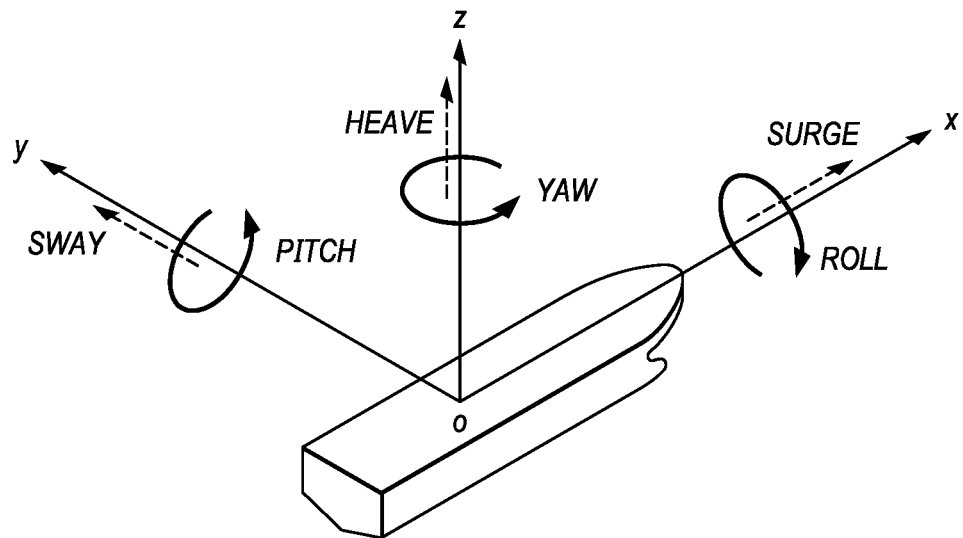
FIG. 2B is a diagram of example degrees of freedom of movement of a user's body.

The sensors 124 can be configured to detect the position and/or orientation of a user's head in multiple dimensions. For example, referring to FIG. 2B, a Cartesian coordinate system can be defined such that the x-axis, y-axis, and z-axis are orthogonal to one another, and intersecting at an origin point O (e.g., corresponding to the position of the user's head). The sensors 124 can detect the user translating her head along one or more of these axis and/or rotating her head about one or more of these axes (e.g., according to six degrees of freedom, 6DoF). For example, the sensors 124 can detect when a user translates her head in a forward or backwards direction (e.g., along the x-axis), sometimes referred to as a "surge" motion. As another example, the sensors 124 can detect when a user translates her head in a left or right direction (e.g., along the y-axis), sometimes referred to as a "sway" motion. As another example, the sensors 124 can detect when a user translates her head in an upward or downward direction (e.g., along the z-axis), sometimes referred to as a "heave" motion. As another example, the sensors 124 can detect when a user rotates her head about the x-axis, sometimes referred to as a "roll" motion. As another example, the sensors 124 can detect when a user rotates her head about the y-axis, sometimes referred to as a "pitch" motion. As another example, the sensors 124 can detect when a user rotates her head about the z-axis, sometimes referred to as a "yaw" motion.

A viewport can be continuously modified based on the user's movements in each of these directions. For example, when a user head performs a surging forward motion, a viewport can be modified such that the user appears to be moving forward within the video content. As another example, when a user's head performs a swaying left motion, a viewport can be modified such that the user appears to be moving left within the video content. As another example, when a user's head performs a heaving upward motion, a viewport can be modified such that the user appears to be moving upward within the video content.

In some implementations, immersive video content can include one or more frames or video pictures representing visual data. For example, one or more frames of video pictures can be presented to a user sequentially to represent visual data changing over time.

In some implementations, immersive video content can include one or more point clouds or meshes representing visual data. For example, video content can include one or more three-dimensional models, each representing a portion of or an entirety of an object. A three-dimensional model can be represented by one or more polygon meshes that define or otherwise approximate the shape of that object. A polygon mesh can include a collection of interconnected vertices that form several edges and faces, which together define a surface representing the shape of an object. In some implementations, a polygon mesh can include one or more triangles (e.g., a triangle mesh), quadrilaterals (e.g., quad meshes), and/or any other shapes.

As described above, video content can be transmitted from a content source (e.g., a video content server) to a display device (e.g., a wearable display device) according to a view-adaptive prefetching technique. This technique is shown in greater detail in FIG. 3.

As described above, multiple sets of video content can be generated to accommodate end clients having different capabilities or requirements. For instance, as shown in FIG. 3, a first set of data 302 can represent a portion of the video content that is intended to be presented to a user at a display time T. In some implementations, if the video content is intended to be presented to a user according to a particular sequence (e.g., a sequence of video frames or video pictures), the display time T can refer to a particular time stamp or time point in the sequence. Further, the first set of data 302 can include data that represents that portion of the video content according to a lower level of detail (e.g., a "basic" or "default" level of detail). For example, the first set of data 302 can include visual data encoded according to a lower resolution and/or lower bit rate.

Further, additional sets of data 304*a*-304*n* can represent the same portion of the video content according to progressively higher levels of detail, such that the video content can be presented with a higher quality level. As example, each of the additional sets of data 304*a* can include data presenting the same portion of the video content as that of the first set of data 302 (e.g., the portion of the video content that is intended to be presented to a user at a display time T). However, each of the additional sets of data 304*a*-304*n* can include data that enables that portion of the video content to be presented to the user according to a higher level of detail. For instance, each of the additional sets of data 304*a*-304*n* can include visual data encoded according to progressively higher resolutions and/or progressively higher bit rates. As an example, the additional set of data 304*a* can include visual data encoded according to a second resolution that is greater than the default resolution and/or a second bit rate that is greater than the default bit rate. Further, the additional set of data 304*n* can include visual data encoded according to a third resolution that is greater than the second resolution and/or a third bit rate that is greater than the second bit rate.

In some implementations, the first set of data 302 can be referred to as a "base layer" of visual data, whereas each of the additional sets of data 304*a*-304*n* can be referred to as a respective "enhancement layer" of visual data. In some implementations, each enhancement layer can include additional data over that of the previous layer that enables the video content to be presented according to progressively higher levels of detail. For example, each of the enhancement layers can include data encoded according to a respective scalable coded atlas, in which data from the enhancement layer is coded relative to a lower quality representation in a hierarchically lower enhancement layer or base layer. Layers can be encoded, for example, using H.264/AVC or High Efficiency Video Coding (HEVC) scalable video coding (SVC). In some implementations, the contents of an enhancement layer can override or replace the contents of base layer and any enhancement layers that are hierarchically below that enhancement layer, for example, when the layers are independently encoded.

In some implementations, the first set of data 302 and each of the additional sets of data 304*a*-304*n* can include data arranged according to a collection of tiles. For example, each of the tiles can include image data that can be used to present a respective portion the video content to the user. The tiles can be interconnected (e.g., in a grid-like arrangement), and can collectively represent all of the available viewports and/or viewing perspectives according to which the video content can be presented by the user.

As shown in FIG. 3, at a time t prior to the display time T, some or all of the first set of data 302 can be streamed from the video content source 104 to the wearable display device 106 and stored in the data buffer 122. In some implementations, the portion of the first set of data 302 that is streamed and stored in the data buffer 122 can include sufficient information to present the portion of the video content corresponding to the display time T, according to any of a first set of viewports. In some implementations, the first set of viewports can correspond to all of the viewing perspectives available to a user to view the video content at the display time T. For example, if the first set of data 302 includes tiles of data, all (or substantially all) of the tiles can be streamed and stored in the data buffer 122. Nevertheless, in some implementations, a subset of the tiles can be streamed and stored in the data buffer 122 instead.

Further, as shown in FIG. 3, at a time t+m subsequent to the time t and prior to the display time T, a portion of the additional set of data 304*a* can be streamed from the video content source 104 to the wearable display device 106 and stored in the data buffer 122. In some implementations, the portion of the additional set of data 304*a* that is streamed and stored in the data buffer 122 can include sufficient information to display the portion of the video content corresponding to the display time T, according to a second set of viewports. In some implementations, the second set of viewports can correspond to a subset of the viewing perspectives available to a user to view the video content at the display time T. For example, if the additional set of data 304*a* includes tiles of data, a subset of the tiles can be streamed and stored in the data buffer 122 instead.

In some implementations, the portion of the additional set of data 304*a* that is streamed and stored in the data buffer 122 can be selected by predicting the viewport 306 that will be used to present the video content to the user at the display time T. For example, if the predicted viewport 306 at the display time T indicates that a particular region of the video content is expected to be in the user's field of view at the display time T, the portion of the additional set of data 304*a* corresponding to that region can be selectively streamed and stored in the data buffer 122. In some implementations, if the additional set of data 304*a* includes tiles of data, the tiles that overlap or coincide with the predicted viewport 306 can be can be selectively streamed and stored in the data buffer 122.

Further, as shown in FIG. 3, at a time t+n subsequent to the time t+m and prior to the display time T, a portion of the additional set of data 304*n* can be streamed from the video content source 104 to the wearable display device 106 and stored in the data buffer 122. In some implementations, the portion of the additional set of data 304*n* that is streamed and stored in the data buffer 122 can include sufficient information to display the portion of the video content corresponding to the display time T, according to a third set of viewports. In some implementations, the third set of viewports can correspond to a subset of the viewing perspectives available to a user to view the video content at the display time T. For example, if the additional set of data 304*n* includes tiles of data, a subset of the tiles can be streamed and stored in the data buffer 122.

In some implementations, the portion of the additional set of data 304*n* that is streamed and stored in the data buffer 122 also can be selected based the predicted viewport 306 at the display time T. For example, if the predicted viewport 306 at the display time T indicates that a particular region of the video content is expected to be in the user's field of view at the display time T, the portion of the additional set of data 304*n* corresponding to that region can be selectively streamed and stored in the data buffer 122.

In some implementations, the portion of the additional set of data 304*n* that is streamed and stored in the data buffer 122 can correspond to a smaller region than the portions of the base layers and/or additional sets of data that were streamed and stored in the data buffer 122 before it. For example, if the additional set of data 304*n* includes tiles of data, the single tile that overlaps or coincides the most with the predicted viewport 306 can be can be selectively streamed and stored in the data buffer 122.

Further, as shown in FIG. 3, at the display time T, the contents of the data buffer 122 can be used to present a portion of video content to the user. For example, a composite data set 308 can be generated based on the contents of the data buffer 122. The composite data set 308 can include portions that enable certain regions of the video content to be presented according to the default level of detail (e.g., the regions corresponding to the portions of the base layer 302 stored in the data buffer 122). Further, the composite data set 308 can include portions that enable certain other regions of the video content to be presented according to higher levels of detail (e.g., the regions corresponding to the portions of the enhancement layers 304*a*-304*n* stored in the data buffer 122).

If the actual viewport at the display time T coincides with the predicted viewport 306 (e.g., the viewing perspective of the user at the display time T was accurately predicted), the region of the video content within the actual viewport can be presented to the user according to a level of detail that is higher than the default level of detail. However, if the actual viewport at the display time T does not coincide with the predicted viewport 306 (e.g., the viewing perspective of the user at the display time T was not accurately predicted) and/or higher quality data is not available in the data buffer 122 (e.g., due to a network outage or a degradation of the network), the region of the video content within the actual viewport can be presented to the user according to the default level of detail.

This can be beneficial, for example, in enabling the display device to present video content corresponding to the predicted viewing perspective according to a higher level of detail in some situations (e.g., if the viewing perspective of the user at the display time coincides with the predicted viewing perspective), while also enabling the display device to present video content corresponding to any other viewing perspective according to a lower level of detail in other situations (e.g., if the viewing perspective of the user at the display device does not coincide with the predicted viewing perspective, and/or the performance of the network is degraded). Accordingly, the presentation of video content remains uninterrupted, even if the user's behavior and/or inputs are different than expected. Further, the presentation of video content is more resilient against changes to the network environment, which may otherwise interrupt or impair the streaming and buffering of data.

Although FIG. 3 shows a single base layer 302 and three enhancement layers 304*a*-304*n*, this is merely an illustrative example. In practice, immersive video content can be represented by any number of layers. As an example, immersive video content can be represented by a base layer and one, two, three, or more enhancement layers.

Similarly, although FIG. 3 shows three prefetching time points or intervals during which data is streamed and buffered in the data buffer 122 (e.g., times t, t+m, and t+n), in practice, data can be streamed and buffered in the data buffer 122 according to any number of different prefetching time points or intervals (e.g., two, three, four, or more time points or intervals).

Further, the span between the display time T and each of the prefetching time points of intervals (e.g., the times t, t+m, and/or t+n) can vary, depending on the implementation. For example, in some implementations, the prefetching time point t can be one or more seconds prior to the display time T. As another example, in some implementations, the fetching time point time t can be less than one second prior to the display time T (e.g., 900 milliseconds, 500 ms, 100 milliseconds, 50 milliseconds, 10 milliseconds, or another other time).

In some implementations, the video content source 104 can predict a viewport for presenting video content at the display time T, and selectively stream video content to the wearable display device 106 according to the prediction (e.g., to "push" data from the video content source 104 to the wearable display device 106). In some implementations, the wearable display device 106 can predict a viewport for presenting video content at the display time T, and request that video content to be selectively streamed from the video content source 104 to the wearable display device 106 according to the prediction (e.g., to "pull" data from the video content source 104 to the wearable display device 106).

The viewport at the display time T can be predicted based on various factors, such as a behavior of the user that is currently viewing the video content, a behavior one or more of users that previously viewed the video content, characteristics of the video content itself, and/or metadata regarding the video content.

As an example, the video content source 104 and/or the wearable display device 106 can track the behavior of the user as she is currently viewing the video content. For instance, the video content source 104 and/or the wearable display device 106 can track the orientation of the user's head over time, and determine corresponding viewports for presenting the video content to the user over time (e.g., a trajectory of viewports or viewing perspectives leading up to the display time T). If the viewports leading up to the display time T are concentrated around a particular spatial region of the video content, the video content source 104 and/or the wearable display device 106 can predict a viewport at the display time T that coincides or overlaps with that spatial region. Further, if the trajectory of viewports leading up to the display time T extends along a particular path, the video content source 104 and/or the wearable display device 106 can predict a viewport at the display time T further along that path.

As another example, the video content source 104 and/or the wearable display device 106 can track the behavior of other users that previously viewed the same video content. For instance, the video content source 104 and/or the wearable display device 106 can track the orientation of the head of each of the users' heads at the display time T, and determine corresponding viewports that were used to present the video content to those users at the display time T. If the viewports for those users are concentrated around a particular spatial region of the video content at the display time T, the video content source 104 and/or the wearable display device 106 can predict a viewport at the display time T for the user that is currently viewing the video content that coincides or overlaps with that spatial region.

As another example, the video content can include information that indicates one or more suggested viewports for presenting the video content at the display time T. For example, the video content that include metadata that expressly indicates, for the display time T, one or more suggested viewport for presenting the video content at that time. The video content source 104 and/or the wearable display device 106 can predict the viewport based on this suggestion (e.g., by selecting a predicted viewport that is the same as or otherwise coincides with one or more of the suggested viewports).

As another example, the video content that include metadata that identifies spatial regions of interest in the video content at the display time T (e.g., spatial regions containing objects in the foreground, prominent animations or movement, points of interest, objects or entities that are speaking or making other sounds, etc.). The video content source 104 and/or the wearable display device 106 can predict the viewport based on this information (e.g., by selecting a predicted viewport that coincides with one or more of the identified spatial regions).

As described above, in some implementations, immersive video content can include one or more point clouds or meshes representing visual data. A view-adaptive prefetching technique also can be performed to stream video content having point clouds or meshes in an efficient manner.

Figure 4:
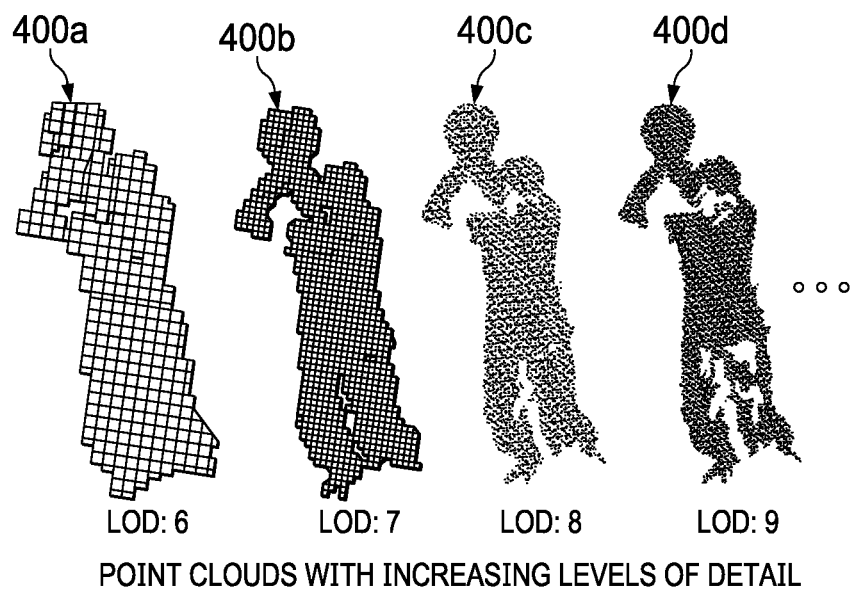
FIG. 4 shows example point clouds.

For instance, multiple sets of video content can be generated to represent one or more objects to be presented to a user at a display time T. Each set of video content can include a respective point cloud or mesh that represents the one or more objects according to a particular level of detail. As an example, FIG. 4 shows four point clouds 400a-400d representing an object (e.g., a figure playing basketball) according to increasing levels of detail. For instance, the first point cloud 400a can have a first number of points and/or a first point density. Further, the second point cloud 400b can have a second number of points greater than the first number of points and/or a second point density greater than the first point density. Further, the third point cloud 400c can have a third number of points greater than the second number of points and/or a third point density greater than the third point density. Further, the fourth point cloud 400d can have a fourth number of points greater than the third number of points and/or a fourth point density greater than the third point density.

Portions of the point clouds 400a-400c can be selectively streamed from a video content source 104 to a wearable display device 106, stored in the data buffer 122, and used to present video content to a user 102 according to a view-adaptive prefetching technique.

Figure 5:
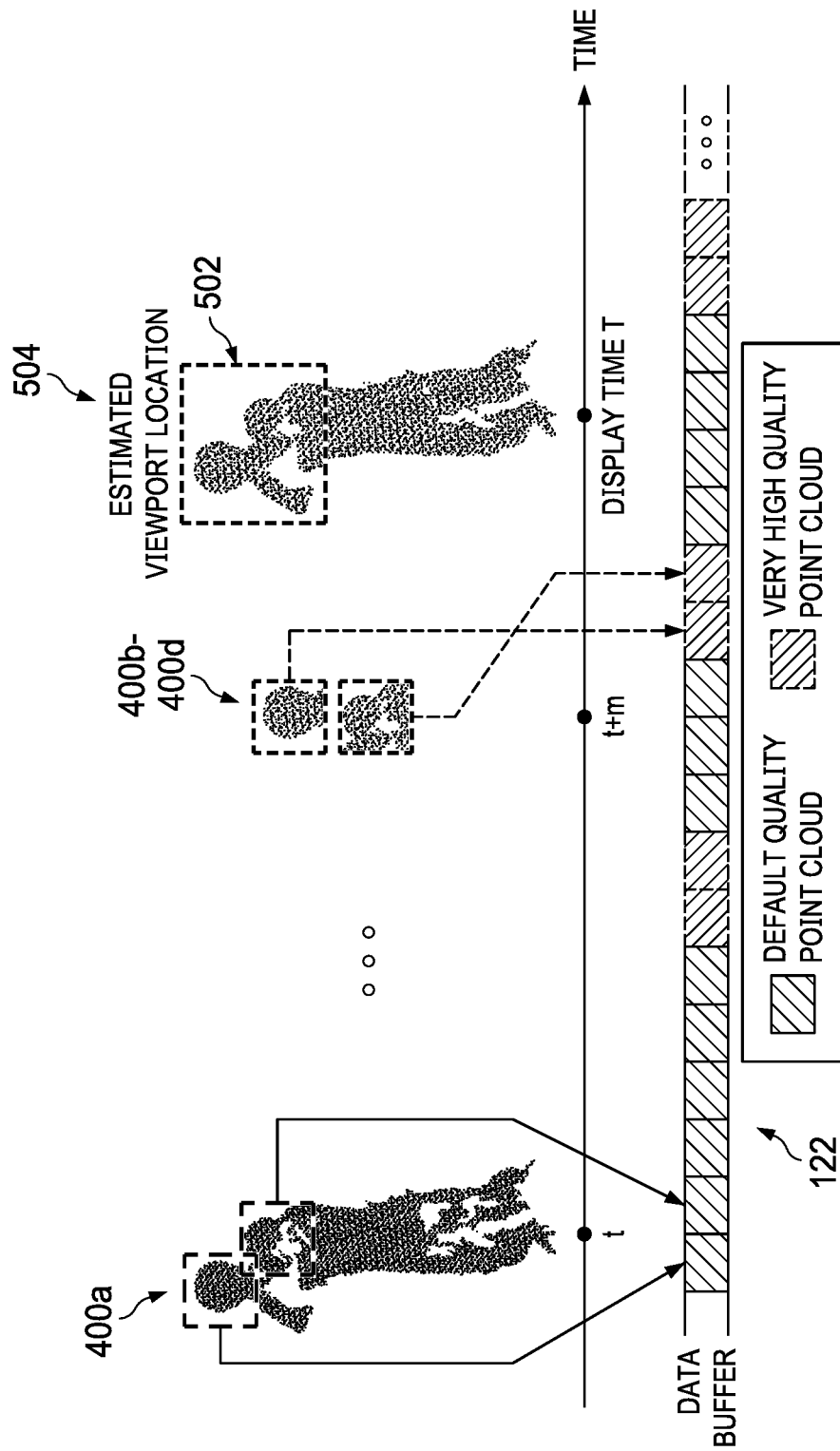
FIG. 5 is a diagram of an example view-adaptive prefetching technique for streaming and buffering video content including point clouds.

For example, as shown in FIG. 5, at a time t prior to the display time T, some or all of the first point cloud 400a can be streamed from the video content source 104 to the wearable display device 106 and stored in the data buffer 122. In some implementations, the portion of the first point cloud 400 that is streamed and stored in the data buffer 122 can include sufficient information to present the entirety of the object at the display time T, according to any of a first set of viewports, and according to a default level of detail. In some implementations, the first set of viewports can correspond to all of the viewing perspectives available to a user to view the object at the display time T. For example, the entirety of the first point cloud 400a can be streamed and stored in the data buffer 122. Nevertheless, in some implementations, a subset of the first point cloud 400a can be streamed and stored in the data buffer 122 instead.

Further, as shown in FIG. 5, at one or more times subsequent to the time t and prior to the display time T (e.g., at a time t+m), portions of one or more of the point clouds 400b-400d can be streamed from the video content source 104 to the wearable display device 106 and stored in the data buffer 122. In some implementations, each of the portions of the point clouds 400b-400d that are streamed and stored in the data buffer 122 can include sufficient information to display particular portions of the object at the display time T, according to levels of detail greater than the default level of detail.

In a similar manner as described above, portions of the point clouds 400b-400d can be selected for streaming and storage in the data buffer 122 based on a predicted viewport 502 at the display time T. For example, if the predicted viewport indicates that certain portions of the object are expected to be in the user's field of view at the display time T, the corresponding portions of the point clouds 400b-400d can be selectively streamed and stored in the data buffer 122. Further, in a similar manner as described above, portions of the point clouds 400b-400d can be selectively streamed and stored in the data buffer 122 according to progressively increasing levels of detail.

Further, as shown in FIG. 5, at the display time T, the contents of the data buffer 122 can be used to present a portion of immersive video content to the user. For example, a composite point cloud 504 can be generated based on the contents of the data buffer 122. The composite point cloud 504 can include portions that enable certain regions of the object to be presented according to the default level of detail (e.g., the regions corresponding to the portions of the point cloud 400a stored in the data buffer 122). Further, the composite point cloud 504 can include portions that enable certain other regions of the object to be presented according to higher levels of detail (e.g., the regions corresponding to the portions of the point clouds 400b-400d stored in the data buffer 122).

If the actual viewport at the display time T coincides with the predicted viewport 502 (e.g., the viewing perspective of the user at the display time T was accurately predicted), the region of the object within the actual viewport can be presented to the user according to a level of detail that is higher than the default level of detail. However, if the actual viewport at the display time T does not coincide with the predicted viewport 502 (e.g., the viewing perspective of the user at the display time T was not accurately predicted) and/or higher quality data is not available (e.g., due to a network outage or a degradation of the network), the region of the object within the actual viewport can be presented to the user according to the default level of detail.

Although FIG. 4 shows four point clouds 400a-400n, this is merely an illustrative example. In practice, immersive video content can be represented by any number of point clouds (e.g., two, three, four, or more) according to any corresponding levels of detail. Similarly, although FIG. 4 shows two prefetching time points or interval during which data is streamed and buffered in the data buffer 122 (e.g., times t and t+m), in practice, data can be streamed and buffered in the data buffer 122 according to any number of different prefetching time points or intervals (e.g., two, three, four, or more time points or intervals).

Further, in some implementations, the video content source 104 can predict a viewport for presenting video content at the display time T, and selectively stream data representing point clouds (or portions thereof) to the wearable display device 106 according to the prediction (e.g., to "push" data from the video content source 104 to the wearable display device 106). In some implementations, the wearable display device 106 can predict a viewport for presenting video content at the display time T, and request that data representing point clouds (or portions thereof) to be selectively streamed from the video content source 104 to the wearable display device 106 according to the prediction (e.g., to "pull" data from the video content source 104 to the wearable display device 106).

Further, the viewport at the display time T can be predicted based on factors similar to those described above, such as a behavior of the user that is currently viewing the video content, a behavior one or more of users that previously viewed the video content, characteristics of the video content itself, and/or metadata regarding the video content.

As described above, in some implementations, video content can be streamed from the video content source 104 to the wearable display device 106 and/or stored in the data buffer 122 differently, depending on the behavior of the user viewing the video content, the behavior of other users that previously viewed the video content, and/or the characteristics of the video content. For example, if this information indicates that the user's viewing perspective can be predicted with a higher degree of certainty, a greater amount of data can be streamed to the data buffer. As another example, if this information indicates that the use's viewing perspective can be predicted only with a lower degree of certainty, a smaller amount of data can be streamed to the data buffer.

In some implementations, the segment rate or bit rate of the streamed data can vary, depending on the collected information. As an example, if the collected information indicates that the user's viewing perspective can be predicted with a higher degree of certainty, data having a higher segment rate or bit rate can be streamed. As another example, if the collected information indicates that the user's viewing perspective can be predicted with only a low degree of certainty, data having a lower segment rate or bit rate can be streamed.

In some implementations, the segment length or bit length of the streamed data can vary, depending on the collected information. As an example, if the collected information indicates that the user's viewing perspective can be predicted with a higher degree of certainty, data having a higher segment length or bit length can be streamed. As another example, if the collected information indicates that the user's viewing perspective can be predicted with only a low degree of certainty, data having a lower segment length or bit length can be streamed.

In some implementations, the coding structure of streamed data can vary, depending on the collected information. As an example, if the collected information indicates that the user's viewing perspective can be predicted with a higher degree of certainty, data that is coded according to a first coding structure can be streamed (e.g., a longer coding structure) As another example, if the collected information indicates that the user's viewing perspective can be predicted with only a low degree of certainty, data that is coded according to a second coding structure can be streamed (e.g., a shorter coding structure). Example coding structures include a group of picture (GOP) structure, such as ultra-low delay video coding (e.g., IPPP coding) or random access hierarchical B (HierB) coding.

In some implementations, the video content source 104 can provide the wearable display device 106 with a suggested or recommended set of settings for streaming immersive video content from the video content source 104 (e.g., a suggested bit rate, data length, coding structure, or any other setting). Further, the video content source 104 can provide the wearable display device 106 with a suggested time window for which that set of settings can be used (e.g., from a time T to a time T+m). In some implementations, the wearable display device 106 can choose to honor the suggested set of settings according to the suggested time window. In some implementations, the wearable display device 106 can choose not to honor the suggested set of settings, and instead use a different set of settings (e.g., in accordance with a default streaming algorithm and buffer control logics).

In some implementations, the suggested length of the time window can vary, depending on the collected information and server analysis. As an example, if the collected information indicates that the user's future viewing perspective can be predicted with a higher degree of certainty, the video content source 104 can suggest that the wearable display device 106 use the suggested set of settings for a particular time window. As another example, if the collected information after analysis indicates that the user's viewing perspective can be predicted with only a low degree of certainty, the video content source 104 can suggest that the wearable display device 106 to use default streaming settings (e.g., by not sending suggestive metadata to the user for that display time window).

In some implementations, properties of the streamed data can vary depending on a variation or diversity of viewports that were used to present the video content to a plurality of users. For example, prior to streaming video content that is intended to be presented to a user at a display time T, the video content source 104 and/or the wearable display device 106 can determine the viewports that were previously used to present that same video content (e.g., at the display time T) to one or more other users.

Figure 6:
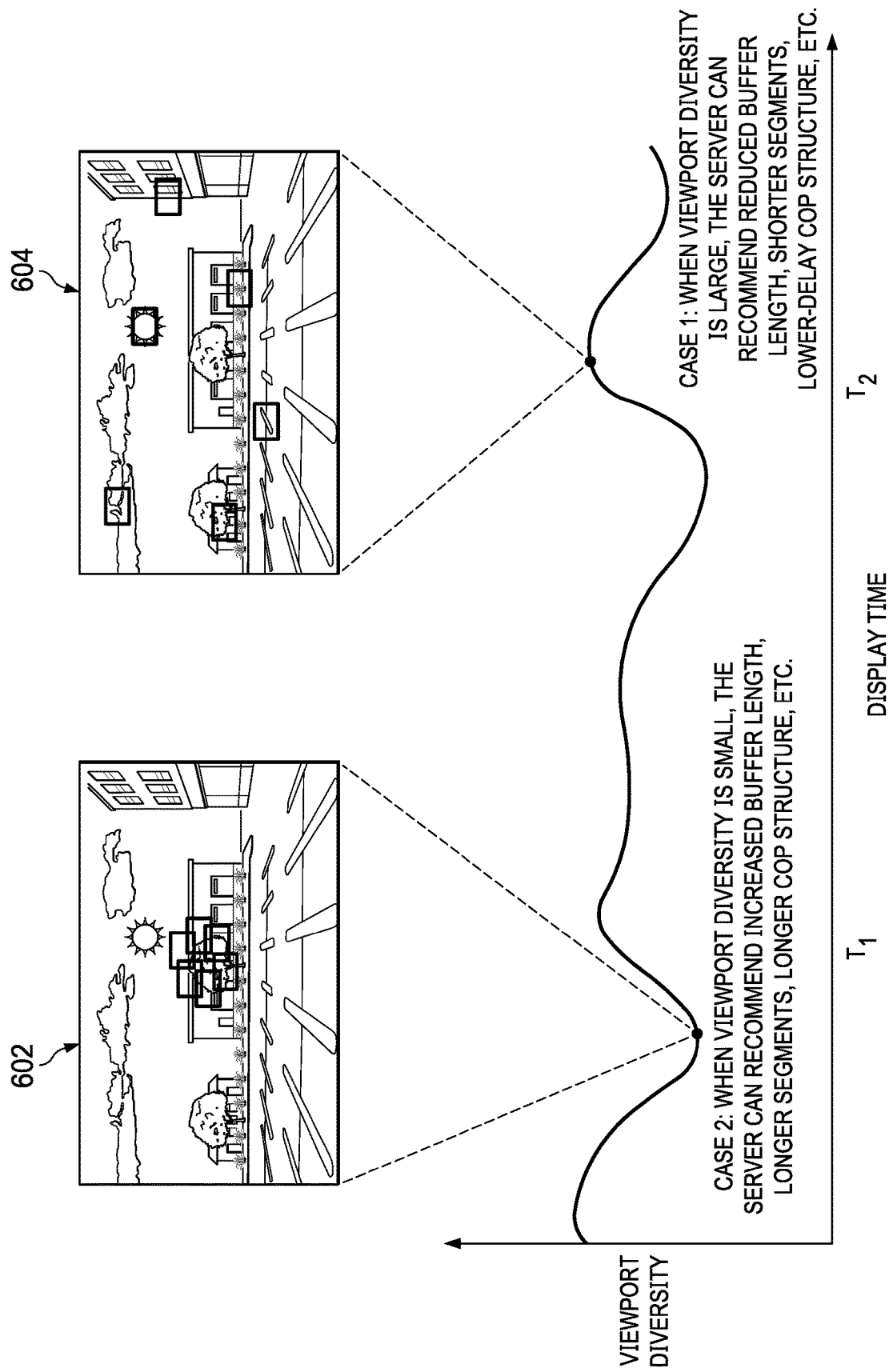
FIG. 6 is a plot of the viewport diversity for example video content over time.

For example, referring to FIG. 6, if the collected data indicates a smaller degree of variation amongst those viewports 602 at display time $T_1$, (e.g., indicating that the previous users viewed the video content according to a less diverse set of viewports), the video content source 104 and/or the wearable display device 106 can cause a larger amount of data can be streamed to the data buffer for presentation to the user ahead of the display time $T_1$. As another example, if the collected data indicates a larger degree of variation amongst those viewports 604 at display time $T_2$, (e.g., indicating that the previous users viewed the video content according to a more diverse set of viewports), the video content source 104 and/or the wearable display device 106 can cause a smaller amount of data can be streamed to the data buffer for presentation to the user ahead of the display time $T_2$.

In some implements, the variation or diversity of viewports can be determined by calculating the variance, the deviation (e.g., standard deviation and/or mean absolute deviation), range, or some other numerical metrics representing the spread of the viewports.

In some implementations, the video content can include metadata that specifies suggested properties of the predicted viewport, the streamed data, and/or the data buffer. The video content source 104 and/or the wearable display device 106 can select and/or modify the predicted viewport, the streamed data, and/or the data buffer based on the metadata.

As an example, the metadata can indicate that suggestions have been provided for a particular time window in the video content (e.g., a starting time, an ending time, an offset time, a duration, etc.).

As another example, the metadata can indicate a suggested viewport for streaming and presenting the video content during the identified time window. In some implementations, the viewport can be parameterized according to a particular coordinate system or frame of reference (e.g., a 6DoF parameterization system, a Cartesian coordinate system, a spherical coordinate system, etc.). In some implementations, the metadata can indicate the boundaries and/or vertices of the suggested viewport, an angle of inclination of the viewport relative to a reference plane, an azimuthal angle of the viewport relative to a reference plane, etc.

As another example, the metadata can indicate a suggested segment rate or bit rate for streaming video content during the identified time window.

As another example, the metadata can indicate a suggested segment length (e.g., the bit length of each "chunk" or packet of data that is streamed during the identified time window).

As another example, the metadata can indicate a suggested coding structure and/or coding length for streaming video content during the identified time window.

As described above, in some implementations, different sets of data can be streamed from the video content source 104 to the wearable display device 106 using different types of communications links across the network 108. For example, referring to FIG. 7, data representing video content according to a lower level of detail can be transmitted using a communications link 702a having lower capabilities and/or lower associated costs. Further, data representing video content according to a higher level of detail can be transmitted using a communications link 702b having higher capabilities and/or higher associated costs.

For instance, data such as a base layer 302 and/or the point cloud 400a can be transmitted using the communications link 702a. Further, data such as one or more enhancement layers 302a-302n and/or the point clouds 400b-400d can be transmitted using the communications link 702b.

In some implementations, the communications link 702a can have a lower bandwidth or throughput than that of the communications link 702b.

In some implementations, the communications link 702a can have a higher latency than that of the communications link 702b.

In some implementations, the communications link 702a can have a higher latency than that of the communications link 702b.

In some implementations, the communications link 702a can have a lower monetary cost of operation than that of the communications link 702b.

In some implementations, the communications link 702a can have a lower computational and/or network resource cost of operation than that of the communications link 702b.

In some implementations, the communications link 702a can be a Wi-Fi communications link Further, the communications link 702b can be a cellular communications link, such as a Fifth Generation (5G) cellular link.

In some implementations, the communications link 702a can be a communications link established using the transmission control protocol (TCP). Further, the communications link 702b can be a communication link established using the user datagram protocol (UDP) link.

In some implementations, the video content source 104 can monitor the performance of the network 108 and each of the communications links over time, and select different communications links for streaming different portions of the video content based on the determined performances.

In some implementations, the video content that include metadata that indicates suggested types of communications links for streaming portions of the video content. For example, the metadata can indicate that a first type of communications link (e.g., a Wi-Fi communications ink) be used to stream a first portion of the video content, whereas a second type of communications link (e.g., a 5G cellular communications link, such as mmWave) be used to stream a second portion of the video content.

Figure 7:
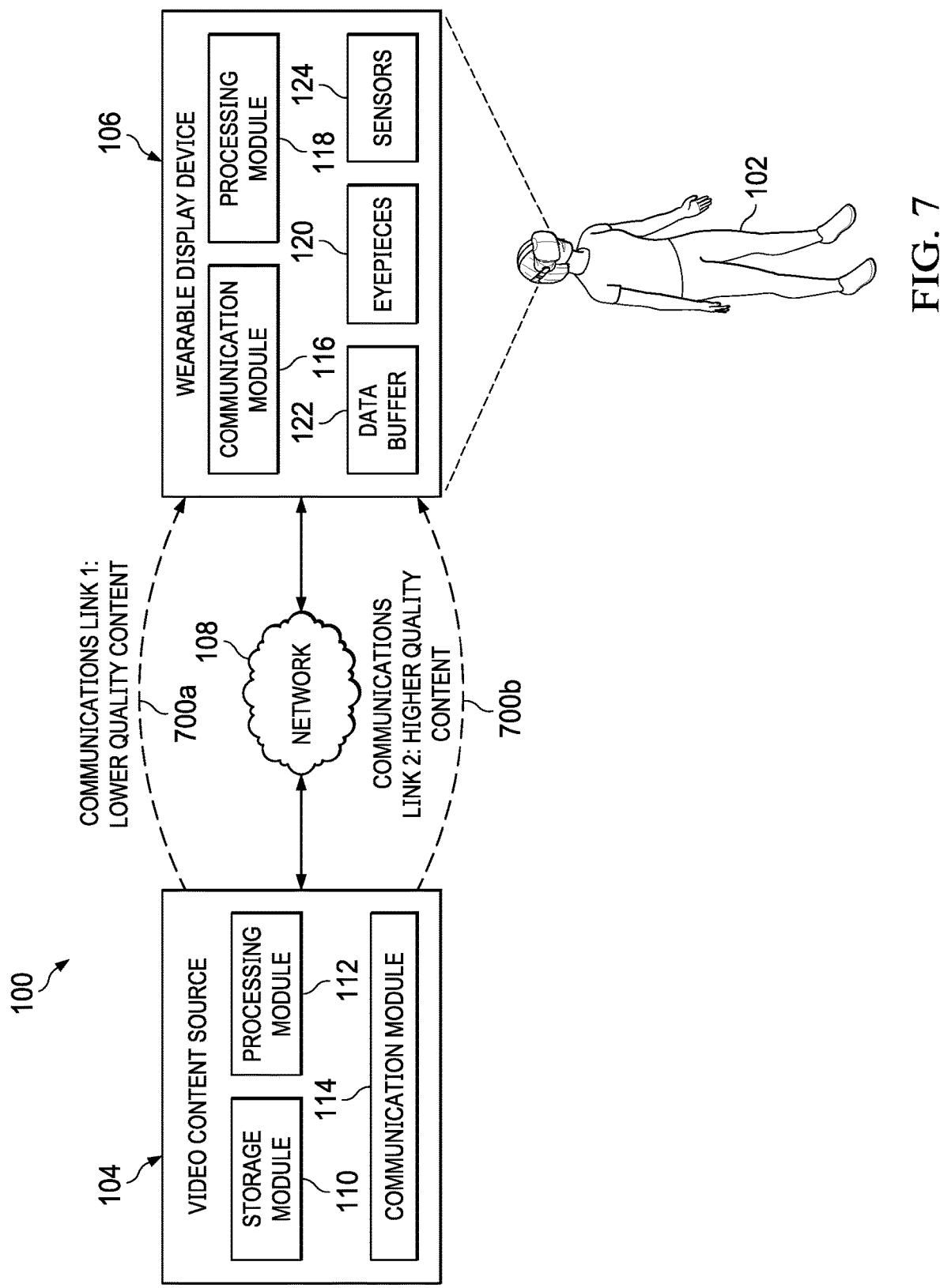
FIG. 7 is diagram of an example system for streaming immersive video content for presentation to a user using multiple communications links.

Although two communications links 702a and 702b are shown in FIG. 7, this is merely an illustrative example. In practice, any number of communications links can be used to transmit data differently across the network 108 (e.g., one, two, three, four, or more communications links).

Example Processes

Figure 8A:
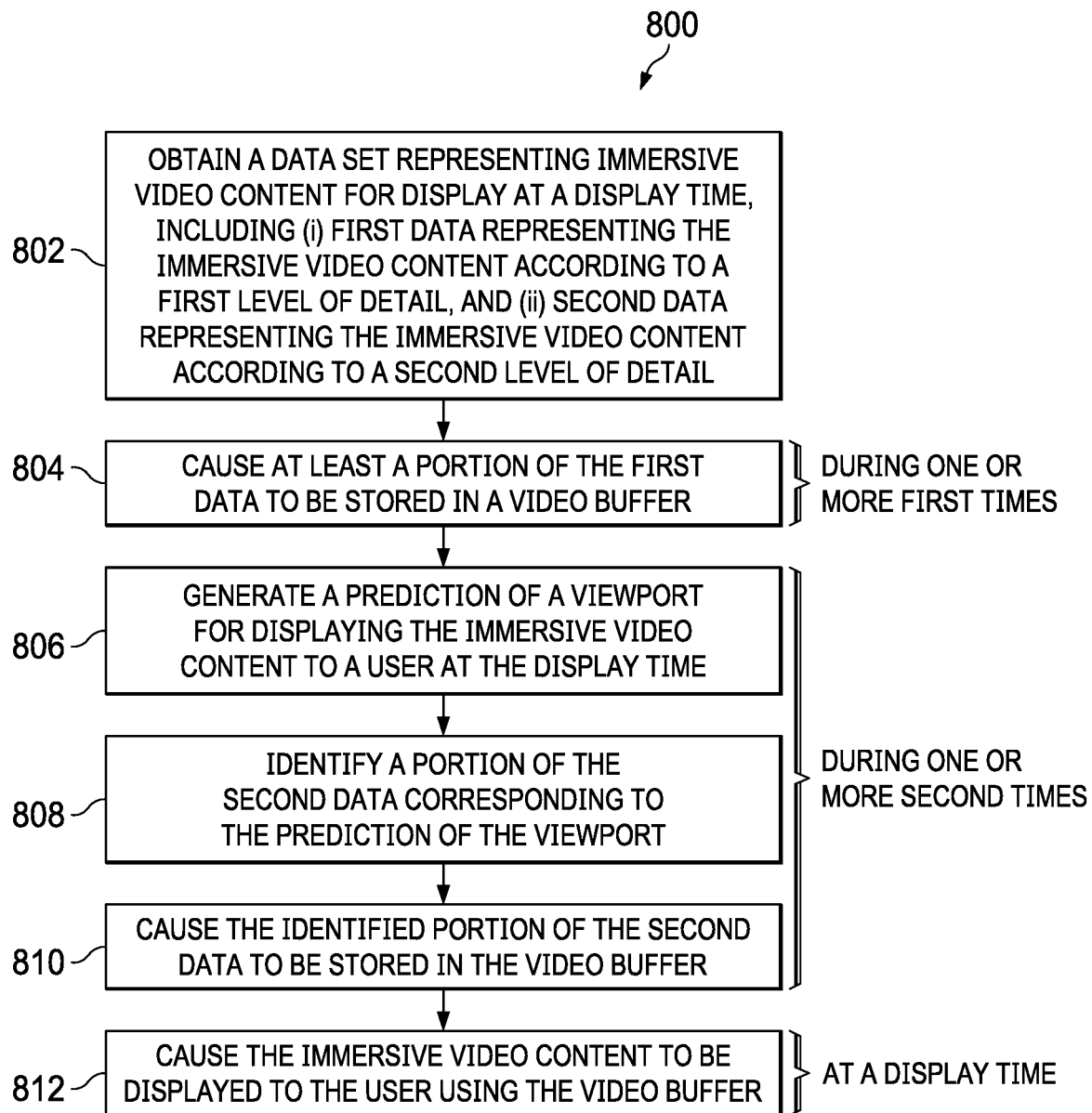
FIGS. 8A-8C are diagram of example processes for streaming immersive video content for presentation to a user.
Figure 9:
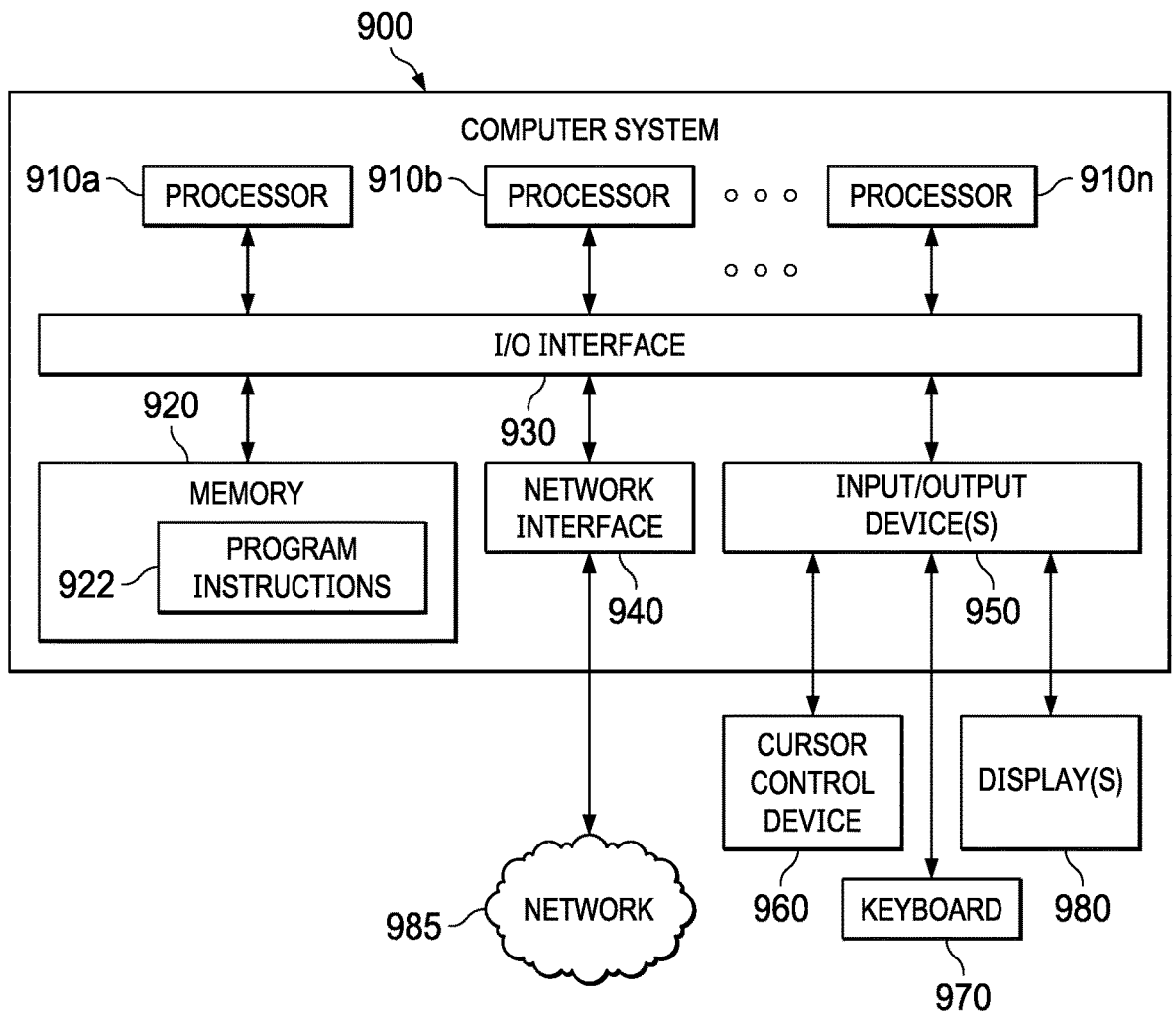
FIG. 9 is a diagram of an example computer system.

FIG. 8A illustrates an example process 800 for streaming immersive video content for presentation to a user. The process 800 can be performed for example, using one or more of the systems described herein (e.g., the systems 100 and/or 900, as shown in FIGS. 1 and 9, respectively).

According to the process 800, a system obtains a data set representing immersive video content for display at a display time (block 802). The data set includes first data representing the immersive video content according to a first level of detail. Further, the data set includes second data representing the immersive video content according to a second level of detail, where the second level of detail is higher than the first level of detail.

In some implementations, the first level of detail can correspond to a first resolution, and the second level of detail can correspond to a second resolution greater than the first resolution.

In some implementations, the first level of detail can correspond to a first bit rate, and the second level of detail can correspond to a second bit rate greater than the first bit rate.

In some implementations, the first data can include a base layer representing the immersive video content, and the second data can include an enhancement layer representing the immersive video content (e.g., as described with reference to FIG. 3).

During one or more first times prior to the display time, the system causes at least a portion of the first data to be stored in a video buffer (block 804). For example, as described with reference to FIG. 3, a first set of data 302 can be stored in a data buffer 122 at a time t. As another example, as described with reference to FIG. 5, at least a portion of a first point cloud 400a can be stored in a data buffer 122 at a time t.

During one or more second times subsequent to the one or more first times and prior to the display time, the system generates a prediction of a viewport for displaying the immersive video content to a user at the display time (block 806). For example, as described with reference to FIG. 3, at a time t+m, a system can generate a prediction of a viewport 306 that will be used to present the video content to the user at a display time T. As another example, as described with reference to FIG. 5, at a time t+m, a system can generate a prediction of a viewport 502 that will be used to present the video content to the user at a display time T.

In some implementations, the prediction of the viewport can be generated based on second data representing one or more second viewports that were used to display the immersive video content to one or more second users.

In some implementations, the data set can include metadata specifying the viewport for displaying the immersive video content to the user at the display time. The prediction of the viewport can be generated based on the metadata.

Further, the system identifies a portion of the second data corresponding to the prediction of the viewport (block 808). For example, as described with reference to FIG. 3, at a time t+m, a system can determine the portion of the set of data 304a coinciding and/or overlapping with the predicted viewport 306. As another example, as described with reference to FIG. 5, at a time t+m, a system can determine the portion of the point cloud(s) 400b-400d coinciding and/or overlapping with the predicted viewport 502.

Further, the system causes the identified portion of the second data to be stored in the video buffer (block 810). For example, as described with reference to FIG. 3, at a time t+m, a system can cause the portion of the set of data 304a coinciding and/or overlapping with the predicted viewport 306 to be stored in the data buffer 122. As another example, as described with reference to FIG. 5, at a time t+m, a system can determine the portion of the point cloud(s) 400b-400d coinciding and/or overlapping with the predicted viewport 502 to be stored in the data buffer 122.

At the display time, the system causes the immersive video content to be displayed to the user using the video buffer (block 812). In some implementations, the immersive video content can be displayed to the user using a wearable display device, such as a virtual reality headset, an augmented reality headset, a mixed reality headset, or a wearable holographic display.

In some implementations, the system can cause the immersive video content to be displayed to the user by generating a composite of data stored in the video buffer, and causing at least a portion of the composite to be displayed to the user. For example, as described with reference to FIG. 3, a composite data set 308 can be generated based on the contents of the data buffer 122. The composite data set 308 can include portions that enable certain regions of the video content to be presented according to the default level of detail, and portions that enable certain other regions of the video content to be presented according to higher levels of detail. As another example, as described with reference to FIG. 5, a composite point cloud 504 can be generated based on the contents of the data buffer 122. The composite point cloud 504 can include portions that enable certain regions of the object to be presented according to the default level of detail, and portions that enable certain other regions of the object to be presented according to higher levels of detail.

In some implementations, the data set can also include third data representing the immersive video content according to a third level of detail The third level of detail can be higher than the second level of detail. Further, during one or more third times subsequent to the one or more second times and prior to the display time, the system can (i) identify a portion of the third data corresponding to the prediction of the viewport, and (ii) cause the identified portion of the third data to be stored in the video buffer. For example, as described with reference to FIG. 3, at a time t+n, a system can cause the portion of the set of data 304n coinciding and/or overlapping with the predicted viewport 306 to be stored in the data buffer 122. As another example, as described with reference to FIG. 5, at a time t+m (or some other time after the time t), a system can determine the portion of the point cloud(s) 400b-400d coinciding and/or overlapping with the predicted viewport 502 to be stored in the data buffer 122.

In some implementations, the portion of the third data can correspond to a first spatial area, and the portion of the second data corresponds to a second spatial area greater than the first spatial area. For example, as described with reference to FIG. 3, the portion of the set of data 304n that is streamed and stored in the data buffer 122 can correspond to a smaller region (e.g., fewer tiles and/or smaller tiles) than the portions of the base layers and/or additional sets of data that were streamed and stored in the data buffer 122 before it.

Figure 8B:
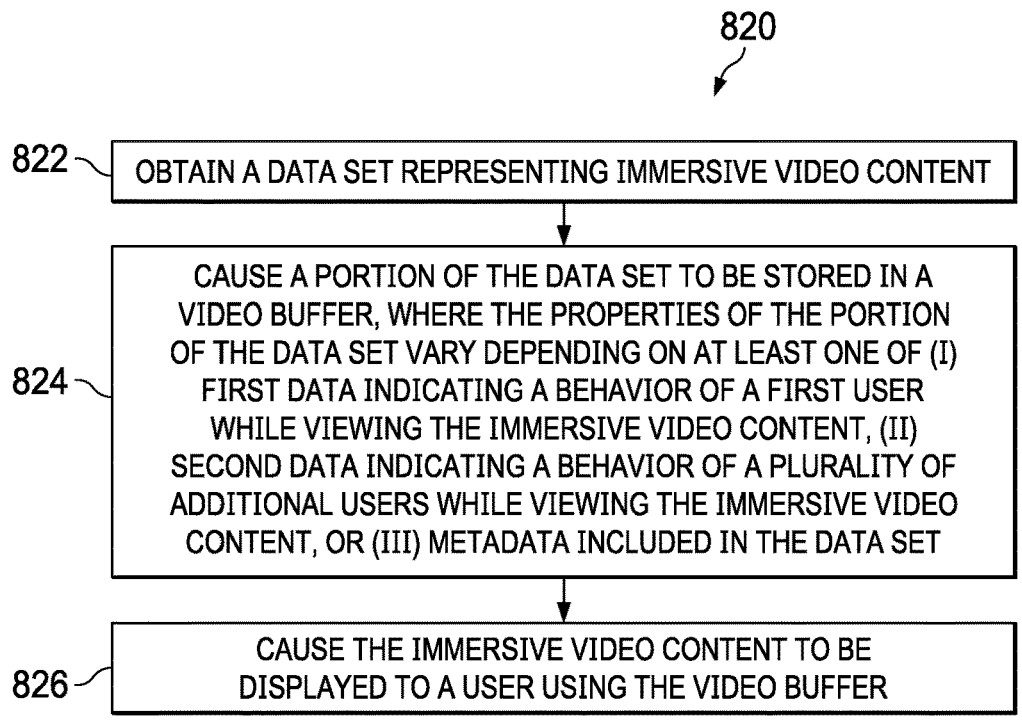

FIG. 8B illustrates an example process 820 for streaming immersive video content for presentation to a user. The process 820 can be performed for example, using one or more of the systems described herein (e.g., the systems 100 and/or 900, as shown in FIGS. 1 and 9, respectively).

According to the process 820, a system obtains a data set representing immersive video content (block 822).

Further, the system causes a portion of the data set to be stored in a video buffer (block 824). The properties of the portion of the data set vary depending on at least one of (i) first data indicating a behavior of a first user while viewing the immersive video content, (ii) second data indicating a behavior of a plurality of additional users while viewing the immersive video content, or (iii) metadata included in the data set.

In some implementations, the first data can include a viewport selected by the first user while viewing the immersive video content. In some implementations, the first data can include a trajectory of viewports selected by the first user while viewing the immersive video content.

In some implementations, the second data can indicate a plurality of additional viewport selected by the additional users while viewing the immersive video content. Further, the system can determine a variation in the additional viewports (e.g., as described with reference to FIG. 6). The properties of the portion of the data set can vary depending on the variation in the additional viewports.

In some implementations, the metadata can include suggested properties of the portion of the data set. The properties of the portion of the data set can include a bit rate of the portion of the data set, a bit length of the portion of the data set, and/or a coding structure of the portion of the data set.

Further, the system causes the immersive video content to be displayed to a user using the video buffer (block 826). In some implementations, the immersive video content can be displayed to the user using a wearable display device, such as a virtual reality headset, an augmented reality headset, a mixed reality headset, or a wearable holographic display.

Figure 8C:
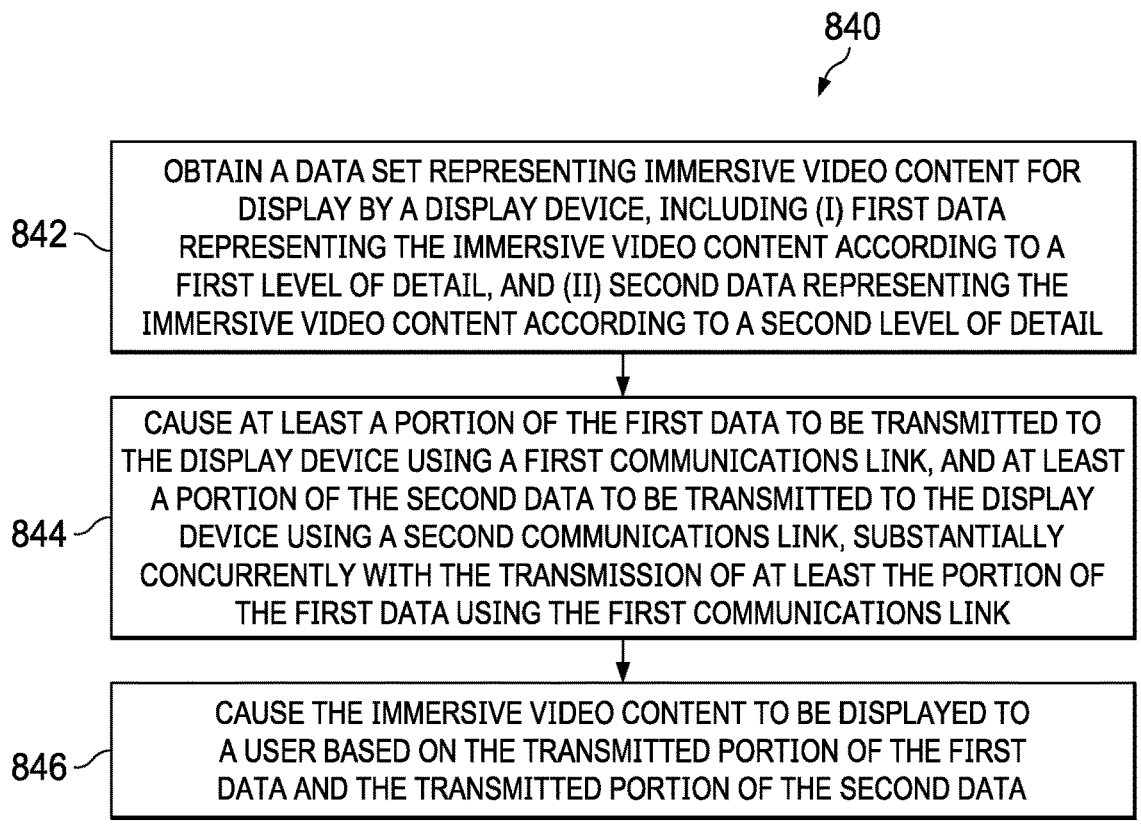

FIG. 8C illustrates an example process 840 for streaming immersive video content for presentation to a user. The process 840 can be performed for example, using one or more of the systems described herein (e.g., the systems 100 and/or 900, as shown in FIGS. 1 and 9, respectively).

According to the process 840, a system obtains a data set representing immersive video content for display by a display device (block 842). The data set includes first data representing the immersive video content according to a first level of detail. The data set also includes second data representing the immersive video content according to a second level of detail, where the second level of detail is higher than the first level of detail. As can example, as described with reference to FIG. 3, the first data can include data that represents that portion of the video content according to a lower level of detail (e.g., a "basic" or "default" level of detail), and the second data can include data representing the same portion of the video content according to progressively higher levels of detail, such that the video content can be presented with a higher quality level.

In some implementations, the first level of detail can correspond to a first resolution, and the second level of detail can correspond to a second resolution greater than the first resolution.

In some implementations, the first level of detail can correspond to a first bit rate, and the second level of detail can correspond to a second bit rate greater than the first bit rate.

In some implementations, the first data can include a base layer representing the immersive video content, and the second data can include an enhancement layer representing the immersive video content.

Further, the system causes (i) at least a portion of the first data to be transmitted to the display device using a first communications link, and (ii) at least a portion of the second data to be transmitted to the display device using a second communications link, substantially concurrently with the transmission of at least the portion of the first data using the first communications link (block 844). The first communication link is different from the second communications link. For example, as described with reference to FIG. 7, at least a portion of the first data to be transmitted to the display device using a first communications link 700*a*, and at least a portion of the second data to be transmitted to the display device using a second communications link 700*b*, substantially concurrently with the transmission of at least the portion of the first data using the first communications link 700*a*.

In some implementations, the first link can have a first bandwidth, and the second link can have a second bandwidth greater than the first bandwidth.

In some implementations, the first link can have a first latency, and the second link can have a second latency less than the first latency.

In some implementations, the first link can be associated with a first cost, and the second link can be associated with a second cost greater than the first cost.

In some implementations, the first link can be a Wi-Fi link and/or a transmission control protocol (TCP) link. Further, the second link can be a Fifth Generation (5G) cellular link and/or a user datagram protocol (UDP) link.

Further, the system causes the immersive video content to be displayed to a user based the transmitted portion of the first data and the transmitted portion of the second data (block 846). In some implementations, the immersive video content can be displayed to the user using a wearable display device, such as a virtual reality headset, an augmented reality headset, a mixed reality headset, or a wearable holographic display.

Example Computer System

FIG. 9 illustrates an example computer system 900 that may implement the video content source 104, the wearable display device 106, and/or any of the other components described herein, (e.g., any of the components described above with reference to FIGS. 1-8C). The computer system 900 may be configured to execute any or all of the embodiments described above (e.g., any of the methods described above with reference to FIGS. 8A-8C). In different embodiments, computer system 900 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

One or more of the embodiments described herein be executed in one or more computer systems 900, which may interact with various other devices. Note that any component, action, or functionality described above with respect to FIGS. 1-8 may be implemented on one or more computers configured as computer system 900 of FIG. 9, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store point cloud compression or point cloud decompression program instructions 922 and/or sensor data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions 922 may be configured to implement an image sensor control application incorporating any of the functionality described above. In some embodiments, program instructions and/or data may be received, sent or stored upon different types of computer-accessible media or on similar media separate from system memory 920 or computer system 900. While computer system 900 is described as implementing the functionality of functional blocks of previous Figures, any of the functionality described herein may be implemented via such a computer system.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 985 (e.g., carrier or agent devices) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 922, which may be processor-executable to implement any element or action described above. In one embodiment, the program instructions may implement the methods described above. In other embodiments, different elements and data may be included. Note that data may include any data or information described above.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method comprising:
obtaining, by one or more processors, a data set representing immersive video content;
causing, by the one or more processors, at least a portion of the data set to be stored in a video buffer,
wherein one or more properties of the portion of the data set vary depending on at least one of:
first data indicating a behavior of a first user while viewing the immersive video content,
second data indicating a behavior of a plurality of additional users while viewing the immersive video content, wherein the second data indicates a plurality of viewports selected by the additional users with respect to the immersive video content, or
metadata included in the data set, and
wherein causing the portion of the data set to be stored in the video buffer comprises:
determining a variation in the viewports, and
varying an amount of the data set that is stored in the video buffer over time based on the variation in the viewports,
wherein the amount of the data set that is stored in the video buffer is increased when there is a decrease in the variation in the viewports, and
wherein the amount of the data set that is stored in the video buffer is decreased when there is an increase in the variation in the viewports; and
causing, by the one or processors, the immersive video content to be displayed to a user using the video buffer.

2. The method of claim 1, wherein the first data indicates an additional viewport selected by the first user while viewing the immersive video content.

3. The method of claim 1, wherein the first data indicates a trajectory of additional viewports selected by the first user while viewing the immersive video content.

4. The method of claim 1, wherein the metadata comprises suggested properties of the portion of the data set.

5. The method of claim 4, wherein the properties of the portion of the data set comprises at least one of:
a bit rate of the portion of the data set,
a bit length of the portion of the data set, or
a coding structure of the portion of the data set.

6. The method of claim 1, wherein the immersive video content is displayed to the user using a wearable display device.

7. The method of claim 1, wherein determining the variation in the additional viewports indicated by the second data comprises determining one or more metrics representing a spread of the additional viewports.

8. The method of claim 7, wherein the one or more metrics comprises at least one of:
a variance metric, or
a deviation metric, or
a range metric.

9. The method of claim 1, wherein an increase in the variation in the additional viewports corresponds to at least one of:
an increase in a bit rate of the portion of the data set,
an increase in a bit length of the portion of the data set, or
a increase in a coding structure of the portion of the data set.

10. The method of claim 1, wherein a decrease in the variation in the additional viewports corresponds to at least one of:
a decrease in a bit rate of the portion of the data set,
a decrease in a bit length of the portion of the data set, or
a decrease in a coding structure of the portion of the data set.

11. A system comprising:
one or more processors; and
memory storing instructions that when executed by the one or more processors, cause the one or more processors to perform operations comprising:
obtaining a data set representing immersive video content;
causing at least a portion of the data set to be stored in a video buffer,
wherein one or more properties of the portion of the data set vary depending on at least one of:
first data indicating a behavior of a first user while viewing the immersive video content,
second data indicating a behavior of a plurality of additional users while viewing the immersive video content, wherein the second data indicates a plurality of viewports selected by the additional users with respect to the immersive video content, or
metadata included in the data set, and
wherein causing the portion of the data set to be stored in the video buffer comprises:
determining a variation in the viewports, and
varying an amount of the data set that is stored in the video buffer over time based on the variation in the viewports,
wherein the amount of the data set that is stored in the video buffer is increased when there is a decrease in the variation in the viewports, and
wherein the amount of the data set that is stored in the video buffer is decreased when there is an increase in the variation in the viewports; and
causing the immersive video content to be displayed to a user using the video buffer.

12. The system of claim 11, wherein the first data indicates an additional viewport selected by the first user while viewing the immersive video content.

13. The system of claim 11, wherein the first data indicates a trajectory of additional viewports selected by the first user while viewing the immersive video content.

14. The system of claim 11, wherein the metadata comprises suggested properties of the portion of the data set.

15. The system of claim 14, wherein the properties of the portion of the data set comprises at least one of:
a bit rate of the portion of the data set,
a bit length of the portion of the data set, or
a coding structure of the portion of the data set.

16. The system of claim 11, wherein the immersive video content is displayed to the user using a wearable display device.

17. One or more non-transitory, computer-readable storage media having instructions stored thereon, that when executed by one or more processors, cause the one or more processors to perform operations comprising:
  obtaining a data set representing immersive video content;
  causing at least a portion of the data set to be stored in a video buffer,
    wherein one or more properties of the portion of the data set vary depending on at least one of:
      first data indicating a behavior of a first user while viewing the immersive video content,
      second data indicating a behavior of a plurality of additional users while viewing the immersive video content, wherein the second data indicates a plurality of viewports selected by the additional users with respect to the immersive video content, or
      metadata included in the data set, and
    wherein causing the portion of the data set to be stored in the video buffer comprises:
      determining a variation in the viewports, and
      varying an amount of the data set that is stored in the video buffer over time based on the variation in the viewports,
      wherein the amount of the data set that is stored in the video buffer is increased when there is a decrease in the variation in the viewports, and
      wherein the amount of the data set that is stored in the video buffer is decreased when there is an increase in the variation in the viewports; and
  causing the immersive video content to be displayed to a user using the video buffer.

18. The one or more non-transitory, computer-readable storage media of claim 17, wherein the first data indicates an additional viewport selected by the first user while viewing the immersive video content.

19. The one or more non-transitory, computer-readable storage media of claim 17, wherein the first data indicates a trajectory of additional viewports selected by the first user while viewing the immersive video content.

20. The one or more non-transitory, computer-readable storage media of claim 17, wherein the metadata comprises suggested properties of the portion of the data set.

21. The one or more non-transitory, computer-readable storage media of claim 20, wherein the properties of the portion of the data set comprises at least one of:
  a bit rate of the portion of the data set,
  a bit length of the portion of the data set, or
  a coding structure of the portion of the data set.

22. The one or more non-transitory, computer-readable storage media of claim 17, wherein the immersive video content is displayed to the user using a wearable display device.

* * * * *